United States Patent [19]

Yokoyama et al.

[11] Patent Number: 4,911,854

[45] Date of Patent: Mar. 27, 1990

[54] ELECTROLYTE FOR AN ELECTROLYTIC CONDENSER

[75] Inventors: Yutaka Yokoyama; Senya Fujinari; Akio Ohtake, all of Ome, Japan

[73] Assignee: Nippon Chemi-Con Corporation, Tokyo, Japan

[21] Appl. No.: 148,552

[22] Filed: Jan. 26, 1988

[51] Int. Cl.$^4$ ................................................ H01G 9/00
[52] U.S. Cl. ..................................... 252/62.2; 361/506
[58] Field of Search ................... 252/62.2; 361/433 E, 361/506

[56] References Cited

U.S. PATENT DOCUMENTS

| | | | |
|---|---|---|---|
| 4,652,968 | 3/1987 | Shimamoto et al. | 252/62.2 |
| 4,762,630 | 8/1988 | Shinozaki et al. | 252/62.2 |
| 4,774,011 | 9/1988 | Mori et al. | 252/62.2 |

Primary Examiner—John F. Niebling
Assistant Examiner—Steven P. Marquis
Attorney, Agent, or Firm—James F. Haley, Jr.

[57] ABSTRACT

An electrolyte for an electrolytic condenser, more particularly for improving electric properties thereof, such as a specific resistance, is disclosed which comprises an ammonium salt of enanthic acid as a solute dissolved in a solvent consisting of ehtylene-glycol.

1 Claim, 1 Drawing Sheet

ELECTROLYTE FOR AN ELECTROLYTIC CONDENSER

FIELD OF THE INVENTION

This invention relates to an electrolyte for an electrolytic condenser, more particularly to the improvement of electric properties thereof, such as a specific resistance.

BACKGROUND OF THE INVENTION

Generally, an electrolytic condenser comprises an electrolytic condenser element formed by winding electrode foils of an anode and a cathode consisting of a film-forming metal, such as alminium, together with a separator, as well as an electrolyte impregnated in the electrolytic condenser element as a driving liquid, which is then sealed in a casing.

The electrolytic condenser is classified into two categories according to allowable voltages, one for low voltages and the other for high voltages. For the latter, boric acid has been used as an electrolyte for formulating the electrolyte liquid.

The electrolyte liquid utilizing boric acid as the electrolyte, however, may produce a large amount of a condensed water (an ester water) due to association of boric acid with the solvent therefor. As a result, evaporation of the condensed water may occur above 100° C. to abnormally increase an inner pressure of the casing, resulting in the risk of opening an explosion-preventive valve and thus in the difficulty for use at the temperature above 100° C. Further, such type of the condenser shows a high specific resistance above 1 kΩ and varies its capacity considerably depending on the temperature, thereby adversely affecting temperature properties to the large extent.

Accordingly, an object of the invention is to improve the reduction of specific resistance and the temperature properties.

SUMMARY OF THE INVENTION

In order to achieve the above object, the invention provides an electrolyte for an electrolytic condenser comprising an ammonium salt of enathic acid as a solute dissolved in a solvent consisting of ethylene-glycol.

In the electrolyte for the electrolytic condenser according to the invention, enanthic acid or salt thereof dissolved in the solvent containing ethylene-glycol shows a high solubility and a high ionization, resulting in the desirable reduction of specific resistance.

Further, the electrolyte according to the invention produces little or no condensed water and therefore enlarges the available temperature range, thereby lowering a variation rate of capacity.

The invention will now be described for its embodiments with reference to the accompanying drawings for better understanding.

DETAILED DESCRIPTION OF THE PREFERRED EMBODIMENT

The invention will be described with reference to conventional prior art.

The composition and the weight ratio (% by weight) of the conventional electrolyte (herein-after referred to as a conventional example) are as follows:

| | |
|---|---|
| Ethylene-glycol | 67% by weight |
| Boric acid | 16.5% by weight |
| Ammonium borate | 16.5% by weight |

This electrolyte has a specific resistance (Rs) of 1 kΩ, a withstand voltage (Vs) of 400 V and a water content ($H_2O$) of 26.0%.

Comparing with the above conventional example, the electrolyte for the electrolytic condenser according to the invention has the following composition and weight ratio.

EXAMPLE 1

| | |
|---|---|
| Ethylene-glycol | 90% by weight |
| Ammonium enanthate | 10% by weight |

The electrolyte of Example 1 contains ethylene-glycol as a main solvent and has a specific resistance (Rs) of 380Ω, a withstand voltage (Vs) of 400 V and a water content ($H_2O$) of 0.5 %, showing the 40% lower specific resistance and the significantly lower water content than those of the conventional example.

Each electrolytic condenser prepared by utilizing each electrolyte, as shown in Example 1, as well as in the conventional example, shows initial properties as the ambient temperature, as shown in Table 1 below. The electrolytic condenser used in this experiment has a rated voltage of 400 WV, a rated capacity of 10 μF and a size of 16 mm diameter and 30mm length.

TABLE 1

| | Initial Properties | | |
|---|---|---|---|
| Electrolyte | Capacity (μF) | tan δ (120 Hz) | Leak Current (μA: half value) |
| Conventional | 10.31 | 0.040 | 2.63 |
| Example 1 | 10.60 | 0.021 | 3.22 |

With each condenser having such initial properties, measurements were obtained, as shown in Table 2 below, after applying a voltage of 400 V between terminals of the condenser under the atmosphere of 110° C. for 1,000 hours.

TABLE 2

| | Initial Properties | | | |
|---|---|---|---|---|
| Elect. | Variation of Capacity (%) | tan δ (120 Hz) | Leak Current (μA: half value) | Ratio of Defective Appearance |
| Conv. | −25 | 0.311 | 7.23 | 9/10 |
| Ex. 1 | −2.2 | 0.024 | 2.73 | 0/10 |

It will be appreciated from Table 2 that variations in capacity and tanδ are significantly lower than those in the conventional electrolyte, while the value of leak current does not substantially vary and keeps a lower level below the initial value. Further, the ratio of the defective appearance may be neglected in comparison with the conventional example of 9/10. This advantageous effect may be derived from the significantly lower water content in Example 1 relative to that in the conventional example, which prevent a vaporized gas from generating and increasing an inner pressure within the casing, thereby deforming its appearance.

The electrical properties for Example 1, as well as the conventional example will be described hereinbelow.

Figure 1:
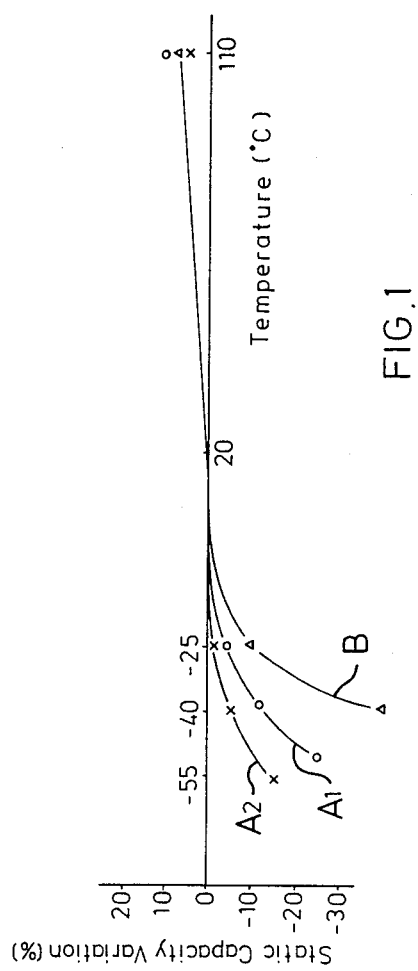
FIG. 1 is a graph showing a variation rate of static capacity versus temperature of the condenser using the electrolyte according to the invention and the conventional electrolyte.

FIG. 1 shows a variation rate of static capacity versus temperature, wherein $A_1$ represents the property of Example 1, and B represents that of the conventional example, in which the capacity variation rate at the temperature of $-55°$ C. to $+110°$ C. was determined for the static capacity under 20° C. It will be apparent from the measurements that the decrease in the temperature below 25° C. results in a sudden decrease in the capacity of the conventional example, but shows a gradual decrease in capacity for Examples, which means the better properties with temperature.

Figure 2:
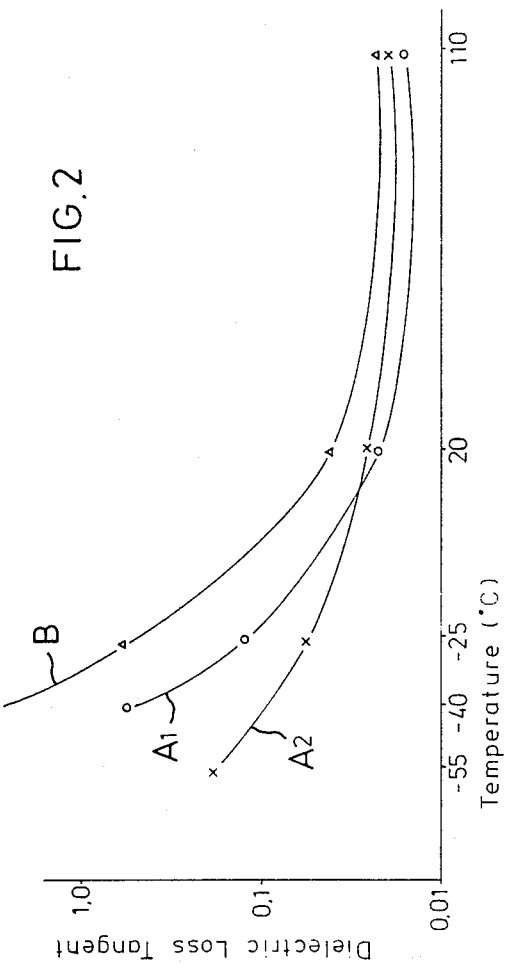
FIG. 2 is a graph showing a variation rate of dielectric loss tangent versus temperature of the condenser using the electrolyte according to the invention and the conventional electrolyte.

FIG. 2 shows a variation of dielectric loss tangent (tan$\delta$) versus temperature for Examples 1, as well as for the conventional example, wherein $A_1$ represents the property of Example 1, and B represents that of the conventional example. The tan$\delta$ for the temperature variation betweeen $-55°$ C. and $+110°$ C. shows a similar variation for both the Example and for the conventional example, but values for the Example are lower relating to the temperature variation than those for the conventional example.

Figure 3:
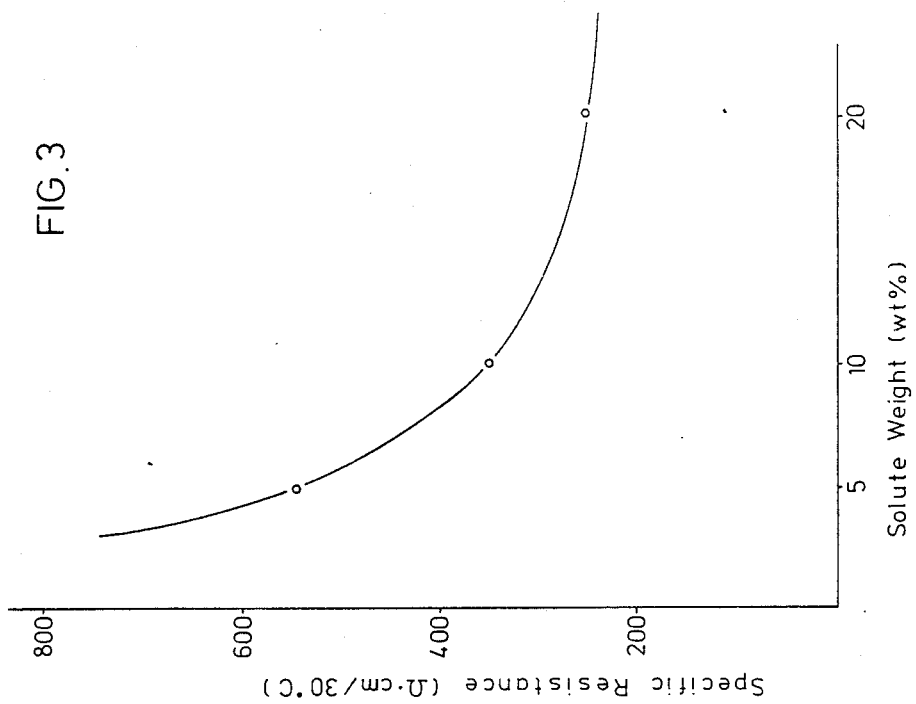
FIG. 3 is a graph showing a specific resistance versus electrolyte weight of the condenser according to the invention.

FIG. 3 shows the relation between a specific resistance and a ratio of a solute weight to the electrolyte liquid. It will be appreciated from FIG. 3 that an increase of the solute weight ratio from 5 wt. % to 20 wt. % may reduce a specific resistance of the electrolyte from 700 $\Omega$.cm to the order of 200 $\Omega$.cm. Thus, in order to establish the specific resistance at a level slightly above 200 $\Omega$.cm in the electrolyte for the condenser according to the invention, the solute weight ratio may be set to the order of 20 %.

As described herein-above, in accordance with the invention, an ammonium salt of enanthic acid as a solute dissolved in the solvent consisting of ethylene-glycol is highly soluble and shows the high ionization of the specific resistance. Further, ethylene-glycol does not produce such a large amount of the condensed water as formed by boric acid, thereby enabling the condenser to be applied at the higher temperature range and the capacity variation to be reduced at the lower temperature range and thus enlarging the available temperature range.

What is claimed is:

1. An electrolyte for an electrolytic condenser, which comprises an ammonium salt of enanthic acid as a solute dissolved in a solvent comsisting of ethylene-glycol.

* * * * *